US012634134B2

(12) United States Patent
Bronchain et al.

(10) Patent No.: US 12,634,134 B2
(45) Date of Patent: May 19, 2026

(54) MASKED KRONECKER SUBSTITUTION FOR POLYNOMIAL MULTIPLICATION

(71) Applicant: NXP B.V., Eindhoven (NL)

(72) Inventors: Olivier Bronchain, Auderghem (BE); Joost Roland Renes, 's-Hertogenbosch (NL); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 356 days.

(21) Appl. No.: 18/345,351

(22) Filed: Jun. 30, 2023

(65) Prior Publication Data

US 2025/0007711 A1      Jan. 2, 2025

(51) Int. Cl.
H04L 9/32 (2006.01)

(52) U.S. Cl.
CPC ..................................... H04L 9/32 (2013.01)

(58) Field of Classification Search
CPC ....................................................... H04L 9/32
See application file for complete search history.

(56) References Cited

U.S. PATENT DOCUMENTS

| | | | | |
|---|---|---|---|---|
| 8,532,289 | B2 * | 9/2013 | Gentry ................. | H04L 9/0816 380/278 |
| 11,206,136 | B1 | 12/2021 | Renes et al. | |
| 11,444,767 | B1 | 9/2022 | Renes et al. | |
| 2006/0107043 | A1 * | 5/2006 | Kim ..................... | H04L 9/0891 713/163 |
| 2015/0033025 | A1 * | 1/2015 | Hoffstein .............. | H04L 9/3026 713/176 |
| 2015/0318991 | A1 * | 11/2015 | Yasuda ................. | H04L 9/3093 380/28 |
| 2019/0363871 | A1 * | 11/2019 | Cheon ................... | H04L 9/304 |

(Continued)

OTHER PUBLICATIONS

Melissa Azouaoui, Olivier Bronchain, Gaentan Cassiers, Clement Hoffmann, Yulia Kuzovkova, Joost Renes, Markus Schonauer, Tobias Schneider, Francois-Xavier Standaert, and Christine van Vredendaal, Leveling dilithium against leakage: Revisited sensitivity analysis and improved implementations, Cryptology ePrint Archive, Paper 2022/1406, 2022, https://eprint.iacr.org/2022/1406.

(Continued)

*Primary Examiner* — Abiy Getachew

(57) ABSTRACT

A data processing system comprising instructions embodied in a non-transitory computer readable medium, the instructions for a cryptographic operation using polynomials for lattice-based cryptography in a processor, the instructions, including: applying a share-wise Kronecker substitution to arithmetic shares of a first polynomial; applying a Kronecker substitution to a second polynomial; multiplying share-wise the Kronecker substitution of the second polynomial and the arithmetic shares of the Kronecker substitution of the shares of the first polynomial to produce arithmetic shares of a first output; converting the shares of the first output to arithmetic shares of a polynomial representation; converting the arithmetic shares of the polynomial representation to Boolean shares of the polynomial representation; adding the Boolean shares of the polynomial representation to Boolean shares of a third polynomial to produce Boolean shares of a second output; and carrying out a cryptographic operation using the Boolean shares of the second output.

24 Claims, 1 Drawing Sheet

(56) References Cited

U.S. PATENT DOCUMENTS

2020/0082738 A1* 3/2020 Poeppelmann ......... H04L 9/002
2022/0337389 A1* 10/2022 Gourjon .................. H04L 9/002
2023/0047965 A1 2/2023 Renes et al.
2024/0126511 A1* 4/2024 Azouaoui ............. H04L 9/3247

OTHER PUBLICATIONS

Olivier Bronchain and Gaetan Cassiers, Bitslicing arithmetic/ boolean masking conversions for fun and profit with application to lattice-based kems, IACR Trans. Cryptogr. Hardw. Embed. Syst. 2022 (2022), No. 4, 553-588.
L. Kronecker, Grundziige einer arithmetischen theorie der algebraischen grossen, Journal fiir die reine und angewandte Mathematik 92 (1882), 1-122.
National Institute of Standards and Technology, Post-quantum cryptography standardization, https: / / csrc. nist . gov /Pro j acts/Post-Quantum-Cryptography/Post-Quantum-Cryptography-Standardization.
Arnold Schonhage, Asymptotically fast algorithms for the numerical multiplication and division of polynomials with complex coefficients, Computer Algebra (Jacques Calmet, ed.), Springer Berlin Heidelberg, 1982, pp. 3-15.
Hauke Steffen, Georg Land, Lucie Kogelheide, and Tim Guneysu, Breaking and protecting the crystal: Side-channel analysis of dilithium in hardware, Cryptology ePrint Archive, Paper 2022/1410, 2022, https: //eprint. iacr.org/2022/1410.

* cited by examiner

MASKED KRONECKER SUBSTITUTION FOR POLYNOMIAL MULTIPLICATION

FIELD OF THE DISCLOSURE

Various exemplary embodiments disclosed herein relate to masked Kronecker substitution for sparse polynomial multiplication.

BACKGROUND

Recent significant advances in quantum computing have accelerated the research into post-quantum cryptography schemes: cryptographic algorithms which run on classical computers but are believed to be still secure even when faced against an adversary with access to a quantum computer. This demand is driven by interest from standardization bodies such as the call for proposals for new public-key cryptography standards by the National Institute of Standards and Technology (NIST). The selection procedure for this new cryptographic standard has started and has further accelerated the research of post-quantum cryptography schemes.

In July 2022 NIST announced its first selection of winners: CRYSTALS-Kyber in the category of key encapsulation mechanisms (KEMs), and CRYSTALS-Dilithium as the primary winner in the digital signature (DS) category. Besides those two algorithms, Falcon and SPHINCS+ have been selected as alternative digital signature schemes, while various KEMs (mostly code-based proposals) have been maintained in the competition as part of a 4th round from which further winners might be selected.

SUMMARY

A summary of various exemplary embodiments is presented below.

Various embodiments relate to a data processing system including instructions embodied in a non-transitory computer readable medium, the instructions for a cryptographic operation using polynomials for lattice-based cryptography in a processor, the instructions, including: applying a share-wise Kronecker substitution to arithmetic shares of a first polynomial; applying a Kronecker substitution to a second polynomial; multiplying share-wise the Kronecker substitution of the second polynomial and the arithmetic shares of the Kronecker substitution of the shares of the first polynomial to produce arithmetic shares of a first output; converting the shares of the first output to arithmetic shares of a polynomial representation; converting the arithmetic shares of the polynomial representation to Boolean shares of the polynomial representation; arithmetically adding the Boolean shares of the polynomial representation to Boolean shares of a third polynomial to produce Boolean shares of a second output; and carrying out a cryptographic operation using the Boolean shares of the second output.

Various embodiments are described, wherein the instructions further include: converting Boolean shares of the first polynomial into the arithmetic shares of the first polynomial.

Various embodiments are described, wherein converting Boolean shares of the first polynomial into the arithmetic shares of the first polynomial includes calculating:

$$\widehat{s}_1^{A,2^{k'}} = SecB2A_{k'}^d\left(\widehat{s}_1^{B,\lceil log_2(2\eta+1)\rceil}\right), \text{ where } \widehat{s}_1^{A,2^{k'}}$$

are arithmetic shares of the first polynomial, d is a number of shares, $$SecB2A_k^d,$$

is a secure Boolean to arithmetic shares conversion function, $\widehat{s}_1^{B,\lceil log_2(2\eta+1)\rceil}$ are Boolean shares of the first polynomial, $\eta$ defines a range $[-\eta, \eta]$ of coefficients of the first polynomial $\widehat{s}_1$, and k' is the arithmetic modulus.

Various embodiments are described, wherein the Kronecker substitution is a Kronecker plus substitution.

Various embodiments are described, wherein multiplying share-wise the Kronecker substitution of the second polynomial and the arithmetic shares of the Kronecker substitution of the shares of the first polynomial includes calculating $$R^{A,2^{k'}} = C \cdot S_1^{A,2^{k'}}, \text{ where } R^{A,2^{k'}} \text{ are the } S_1^{A,2^{k'}}$$

arithmetic shares of a first output, C is a Kronecker representation of the second polynomial, and are the arithmetic shares of a Kronecker representation of the first polynomial.

Various embodiments are described, wherein adding the Boolean shares of the polynomial representation to Boolean shares of a third polynomial to produce Boolean shares of a second output includes calculating $$\hat{R}^{B,log_2(4\gamma_1)} = SecAdd_{log_2(4\gamma_1)}^d\left(\hat{y}^{B,log_2(2\gamma_1)}, \hat{R}^{B,log_2(2\gamma_1)}\right),$$

where $\hat{R}^{B,log_2(4\gamma_1)}$ are Boolean shares of the second output, $$SecAdd_{log_2(4\gamma_1)}^d$$

is a secure add function, $\hat{y}^{B,log_2(2\gamma_1)}$ are the Boolean shares of a third polynomial, $\hat{R}^{B,log_2(2\gamma_1)}$ are the Boolean shares of the polynomial representation, and $\gamma 1$ defines a range $[-\gamma_1-1,\gamma_1]$ of the coefficients of the third polynomial $\hat{y}$.

Further various embodiments relate to a data processing system including instructions embodied in a non-transitory computer readable medium, the instructions for a cryptographic operation using polynomials for lattice-based cryptography in a processor, the instructions, including: applying a share-wise Kronecker substitution to arithmetic shares of a first polynomial; applying a Kronecker substitution to a second polynomial; multiplying share-wise the Kronecker substitution of the second polynomial and the arithmetic shares of the Kronecker substitution of the shares of the first polynomial to produce arithmetic shares of a first output; converting the shares of the first output to arithmetic shares of a polynomial representation; converting the arithmetic shares of the polynomial representation to Boolean shares of the polynomial representation; subtracting the Boolean shares of the polynomial representation to Boolean shares of a third polynomial to produce Boolean shares of a second output; and carrying out a cryptographic operation using the Boolean shares of the second output.

Various embodiments are described, wherein the instructions further include: converting Boolean shares of the first polynomial into the arithmetic shares of the first polynomial.

Various embodiments are described, wherein converting Boolean shares of the first polynomial into the arithmetic shares of the first polynomial includes calculating:

$$\widehat{s}_2^{A,2^{k'}} = SecB2A_{k'}^d\left(\widehat{s}_2^{B,\lceil log_2(2\eta+1)\rceil}\right), \text{ where } \widehat{s}_2^{A,2^{k'}}$$

are arithmetic shares of the first polynomial, d is a number of shares, $$SecB2A_k^d,$$

is a secure Boolean to arithmetic shares conversion function, $\widehat{s}_2^{B,\lceil log_2(2\eta+1)\rceil}$ are Boolean shares of the first polynomial, $\eta$ defines a range $[-\eta,\eta]$ of coefficients of the first polynomial $\hat{s}_2$, and k' is the arithmetic modulus.

Various embodiments are described, wherein the Kronecker substitution is a Kronecker plus substitution.

Various embodiments are described, wherein multiplying share-wise the Kronecker substitution of the second polynomial and the arithmetic shares of the Kronecker substitution of the shares of the first polynomial includes calculating $$R^{A,2^{k'}} = C \cdot S_2^{A,2^{k'}}, \text{ where } R^{A,2^{k'}} \text{ are the}$$

$$S_2^{A,2^{k'}}$$

arithmetic shares of a first output, C is a Kronecker representation of the second polynomial, and
are the arithmetic shares of a Kronecker representation of the first polynomial.

Various embodiments are described, wherein subtracting the Boolean shares of the polynomial representation to Boolean shares of a third polynomial to produce Boolean shares of a second output includes calculating $$\hat{R}^{B,log_2(4\gamma_2)} \leftarrow SecSub_{log_2(4\gamma_2)}^d\left(\widehat{w_0}^{B,log_2(2\gamma_2)}, \hat{R}^{B,log_2(2\gamma_2)}\right),$$

where $\hat{R}^{B,log_2(4\gamma_2)}$ are the Boolean shares of the second output, $$SecAdd_{log_2(4\gamma_1))}^d$$

is a secure add function, $\widehat{w_0}^{B,log_2(2\gamma_2)}$ are the Boolean shares of a third polynomial, $\hat{R}^{B,log_2(2\gamma_2)}$ are the Boolean shares of the polynomial representation, and $\gamma_2$ defines a range $(-\gamma_2, \gamma_2)$ of the coefficients of the third polynomial $\widehat{w_0}$.

Further various embodiments relate to a method for a cryptographic operation using polynomials for lattice-based cryptography, including: applying a share-wise Kronecker substitution to arithmetic shares of a first polynomial; applying a Kronecker substitution to a second polynomial; multiplying share-wise the Kronecker substitution of the second polynomial and the arithmetic shares of the Kronecker substitution of the shares of the first polynomial to produce arithmetic shares of a first output; converting the shares of the first output to arithmetic shares of a polynomial representation; converting the arithmetic shares of the polynomial representation to Boolean shares of the polynomial representation; arithmetically adding the Boolean shares of the polynomial representation to Boolean shares of a third polynomial to produce Boolean shares of a second output; and carrying out a cryptographic operation using the Boolean shares of the second output.

Various embodiments are described, wherein the instructions further include: converting Boolean shares of the first polynomial into the arithmetic shares of the first polynomial.

Various embodiments are described, wherein converting Boolean shares of the first polynomial into the arithmetic shares of the first polynomial includes calculating:

$$\hat{s}_1^{A,2^{k'}} = SecB2A_{k'}^d\left(\hat{s}_1^{B,\lceil log_2(2\eta+1)\rceil}\right), \text{ where } \hat{s}_1^{A,2^{k'}}$$

are arithmetic shares of the first polynomial, d is a number of shares, $$SecB2A_k^d,$$

is a secure Boolean to arithmetic shares conversion function, $\hat{s}_1^{B,\lceil log_2(2\eta+1)\rceil}$ are Boolean shares of the first polynomial, n defines a range $[-\eta,\eta]$ of coefficients of the first polynomial $\hat{s}_1$, and k' is the arithmetic modulus.

Various embodiments are described, wherein the Kronecker substitution is a Kronecker plus substitution.

Various embodiments are described, wherein multiplying share-wise the Kronecker substitution of the second polynomial and the arithmetic shares of the Kronecker substitution of the shares of the first polynomial includes calculating $$R^{A,2^{k'}} = C \cdot S_1^{A,2^{k'}}, \text{ where } R^{A,2^{k'}} \text{ are the}$$

$$S_1^{A,2^{k'}}$$

arithmetic shares of a first output, C is a Kronecker representation of the second polynomial, and
are the arithmetic shares of a Kronecker representation of the first polynomial.

Various embodiments are described, wherein adding the Boolean shares of the polynomial representation to Boolean shares of a third polynomial to produce Boolean shares of a second output includes calculating $$\hat{R}^{B,log_2(4\gamma_1)} = SecAdd_{log_2(4\gamma_1)}^d\left(\hat{y}^{B,log_2(2\gamma_1)}, \hat{R}^{B,log_2(2\gamma_1)}\right),$$

where $\hat{R}^{B,log_2(4\gamma_1)}$ are Boolean shares of the second output, $$SecAdd_{log_2(4\gamma_1)}^d$$

is a secure add function, $\hat{y}^{B,log_2(2\gamma_1)}$ are the Boolean shares of a third polynomial, $\hat{R}^{B,log_2(2\gamma_1)}$ are the Boolean shares of the polynomial representation, and $\gamma_1$ defines a range $[-\gamma_1-1,\gamma_1]$ of the coefficients of the third polynomial $\hat{y}$.

Further various embodiments relate to a method for a cryptographic operation using polynomials for lattice-based cryptography in a processor, the instructions, including:

applying a share-wise Kronecker substitution to arithmetic shares of a first polynomial; applying a Kronecker substitution to a second polynomial; multiplying share-wise the Kronecker substitution of the second polynomial and the arithmetic shares of the Kronecker substitution of the shares of the first polynomial to produce arithmetic shares of a first output; converting the shares of the first output to arithmetic shares of a polynomial representation; converting the arithmetic shares of the polynomial representation to Boolean shares of the polynomial representation; subtracting the Boolean shares of the polynomial representation to Boolean shares of a third polynomial to produce Boolean shares of a second output; and carrying out a cryptographic operation using the Boolean shares of the second output.

Various embodiments are described, wherein the instructions further include: converting Boolean shares of the first polynomial into the arithmetic shares of the first polynomial.

Various embodiments are described, wherein converting Boolean shares of the first polynomial into the arithmetic shares of the first polynomial includes calculating:

$$\widetilde{s}_2^{A,2^{k'}} = SecB2A_{k'}^d\left(\widetilde{s}_2^{-B,\lceil log_2(2\eta+1)\rceil}\right), \text{ where } \widetilde{s}_2^{-A,2^{k'}}$$

are arithmetic shares of the first polynomial, d is a number of shares, $$SecB2A_k^d,$$

is a secure Boolean to arithmetic shares conversion function, $\widetilde{s}_2^{\ B,\lceil log_2(2\eta+1)\rceil}$ are Boolean shares of the first polynomial, $\eta$ defines a range $[-\eta,\eta]$ of coefficients of the first polynomial $\hat{s}_2$, and k' is the arithmetic modulus.

Various embodiments are described, wherein the Kronecker substitution is a Kronecker plus substitution.

Various embodiments are described, wherein multiplying share-wise the Kronecker substitution of the second polynomial and the arithmetic shares of the Kronecker substitution of the shares of the first polynomial includes calculating $$R^{A,2^{k'}} = C \cdot S_2^{A,2^{k'}}, \text{ where } R^{A,2^{k'}}$$

are the arithmetic shares of a first output. C is a Kronecker representation of the second polynomial, and $$S_2^{A,2^{k'}}$$

are the arithmetic shares of a Kronecker representation of the first polynomial.

Various embodiments are described, wherein subtracting the Boolean shares of the polynomial representation to Boolean shares of a third polynomial to produce Boolean shares of a second output includes calculating $$\hat{R}^{B,log_2(4\gamma_2)} \leftarrow SecSub_{log_2(4\gamma_2)}^d\left(\widehat{w}_a^{B,log_2(2\gamma_2)}, \hat{R}^{B,log_2(2\gamma_2)}\right),$$

where $\hat{R}^{B,log_2(2\gamma_2)}$ are the Boolean shares of the second output, $$SecAdd_{log_2(4\gamma_1)}^d)$$

is a secure add function, $\widehat{w}_0^{\ B,log_2(2\gamma_2)}$ are the Boolean shares of a third polynomial, $\hat{R}^{B,log_2(2\gamma_2)}$ are the Boolean shares of the polynomial representation, and $\gamma_2$ defines a range $(-\gamma_2, \gamma_2)$ of the coefficients of the third polynomial $\widehat{w}_0$.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figures 1, 2:
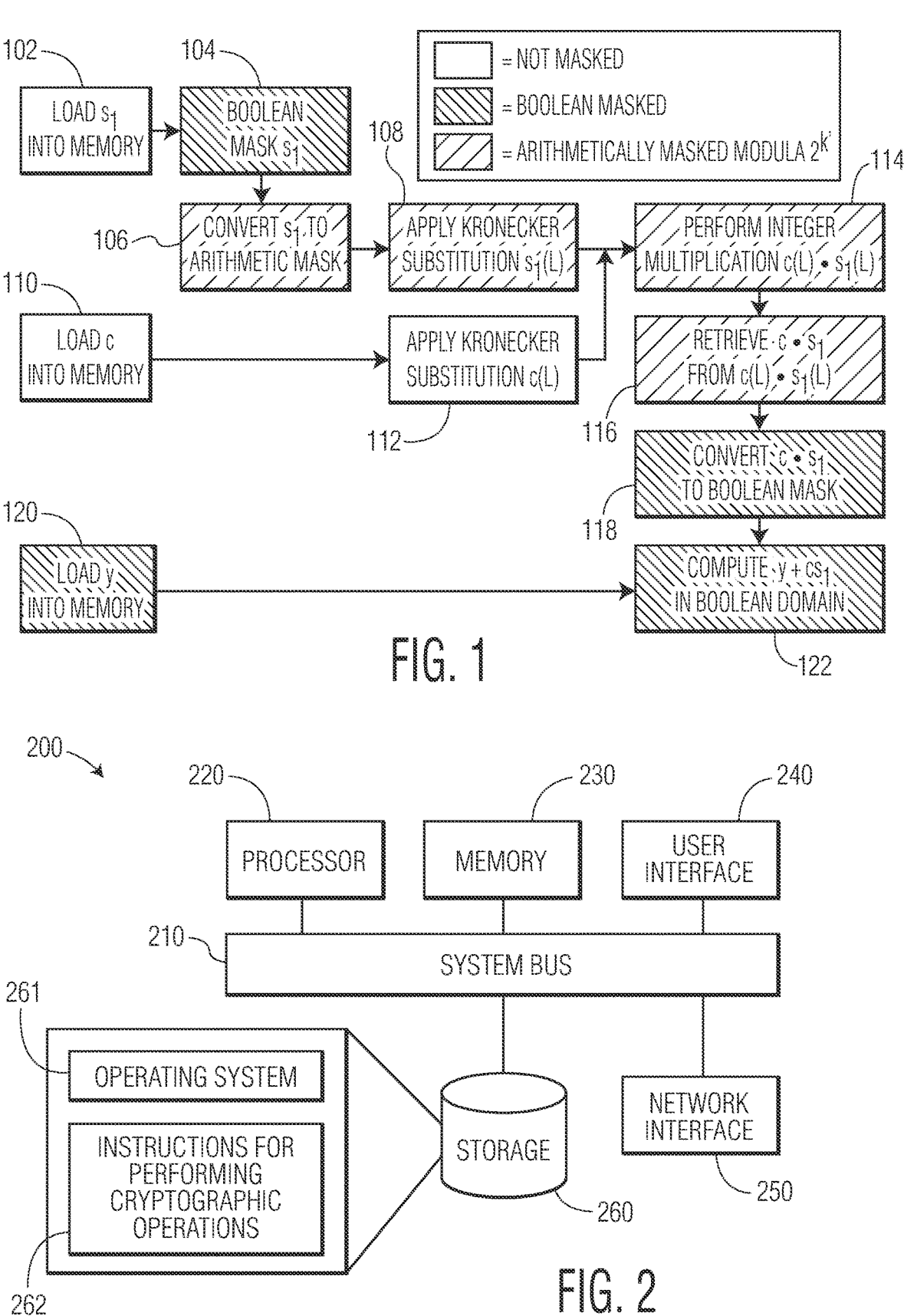
FIG. 1 illustrates a flow diagram of a method to calculate $y+cs_1$.
FIG. 2 illustrates an exemplary hardware diagram 200 for implementing cryptographic operation such as $y+cs_1$ or $w_0-cs_2$.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of cryptographic methods and systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Efficient implementation of the future NIST standards for asymmetric post-quantum cryptography is an important challenge that has to be addressed in order to enable large scale deployment of the standardized algorithms. In this context, the implementations must be simultaneously fast, memory efficient and protected against physical (i.e., side-channel, fault) attacks. In this disclosure, a method is described to compute $y+cs_1$ or $w_0-cs_2$, a crucial part of the Dilithium signature generation algorithm, such that they are hardened against side-channel attacks yet remain efficient. In particular, platforms are targeted where arithmetic co-processors for large integer multiplication are available. The appropriate masking domain is selected for each of the operations, reducing the overhead for masking conversions and to get the most use out of the existing hardware. It will be shown how this can be done in a way that minimizes the memory requirements on the implementation, which is often a bottleneck for (hardened) embedded implementations.

Recent significant advances in quantum computing have accelerated the research into post-quantum cryptography schemes: cryptographic algorithms which run on classical computers but are believed to be still secure even when faced against an adversary with access to a quantum computer. This demand is driven by interest from standardization bodies such as the call for proposals for new public-key cryptography standards by the National Institute of Standards and Technology (NIST). The selection procedure for this new cryptographic standard has started and has further accelerated the research of post-quantum cryptography schemes.

In July 2022 NIST announced its first selection of winners: CRYSTALS-Kyber in the category of key encapsulation mechanisms (KEMs), and CRYSTALS-Dilithium as the primary winner in the digital signature (DS) category. Besides those two algorithms, Falcon and SPHINCS+ have been selected as alternative digital signature schemes, while various KEMs (mostly code-based proposals) have been maintained in the competition as part of a 4th round from which further winners might be selected. Even though winners already have been selected, standards will only be published in 2024. In this disclosure the focus is on the signature scheme Dilithium.

The lattice-based mathematical problems that underlie Dilithium (and Kyber) are significantly different from the classical (elliptic-curve) discrete logarithm problem. However, the construction from a hard problem into a signature scheme follows a similar approach: starting from an interactive sigma protocol, the Fiat-Shamir paradigm can be applied to obtain a non-interactive authentication protocol that can be used for digital signatures. More concretely, the Dilithium protocol starts by generating an ephemeral secret y, which is used to generate a commitment $w_1=$HighBits $(w,2\gamma_2)$ from $w=Ay$ by "rounding away" the remainder modulo $2\gamma_2$, where A is the lattice corresponding to the signer's key pair and $\gamma_2$ is a parameter that is chosen as part of the Dilithium security level. The commitment is hashed together with the message digest u to obtain the challenge $c=H(\mu\|w_1)$. Finally, a response $z=y+cs_1$ is generated where $s_1$ is part of the secret key. It is crucial that no information is leaked about the ephemeral secret y or the long-term secret $s_1$. This is very similar to the Schnorr sigma and digital signature scheme based on elliptic curves (e.g., EdDSA), where this is a modular multiplication and addition. However, in the case of Dilithium y, c and $s_1$ are all polynomials in $\mathbb{Z}[X]/(X^{256}+1)$. Similarly, the value $w_0-cs_2$ is computed where no information is to be leaked about the ephemeral secret value $w_0$ and the long-term secret value $s_2$.

This disclosure describes a method to compute $y+cs_1$ or $w_0-cs_2$ such that they are hardened against side-channel attacks yet remain efficient. In particular, platforms are targeted where arithmetic co-processors for large integer multiplication are available. Such co-processors are typically used for RSA and/or ECC, so are present in many systems today. Moreover, the memory footprint of $s_1$ is minimized as well as the number of operations on the secrets in unmasked form. This is done by selecting the appropriate masking domain for each of the operations, reducing the overhead for masking conversions, and being able to get the most use out of the existing hardware. FIG. 1 illustrates a flow diagram of a method to calculate $y+cs_1$ at a high level. A completely analogous sequence of steps can be described for $w_0-cs_2$. Typical choices for k' and $L=2^{l'}$ could be k'=8 or k'=9 and l'=16. To begin, the method 100 loads value $s_1$ is into memory 102. Then the method 100 Boolean masks $s_1$ at step 104. Then the Boolean masked $s_1$ is converted to arithmetic masking at step 106. The method 100 then applies the Kronecker substitution on $s_1$ at step 108. The method 100 also loads c into memory at step 110. Then the method 100 applies the Kronecker substitution on c at step 112. Next, the method 100 performs the integer multiplication of the Kronecker representations of $s_1$ and c at step 114. Then the method retrieves $c \cdot s_1$ from the result of the integer multiplication at step 116. The value $c \cdot s_1$ is then converted to Boolean masking at step 118. The method 100 loads y into memory at step 120. Then the method computes $y+c \cdot s_1$ in the Boolean domain 122.

Masking allows for the protection of an intermediate variable x against side-channel attack by enforcing an implementation to replace manipulations on x by manipulations on d shares. There, each share is uniformly distributed such that any combination of d−1 shares is independent of x. The embodiments described herein makes use of two ways to split the sensitive variable, namely arithmetic masking and Boolean masking.

With arithmetic masking, a variable $x \in \mathbb{Z}_p$ is protected for an arbitrary modulus p. The ensemble of d shares of x is denoted as the arithmetic sharing $x^{A,p} \in \mathbb{Z}_p^d$. The i-th share is denoted as $$x_i^{A,p} \in \mathbb{Z}_p$$

for all $0 \le i < d$. The relation between the shares and x are given such that the sum of all the shares over $\mathbb{Z}_p$ is x. Specifically, $$x = \sum_{i=0}^{d-1} x_i^{A,p} \bmod p.$$

Eventually, it is noted that computing in a protected manner $z=x+y \bmod p$ with a public constant $y \in \mathbb{Z}_p$, a sharing $x^{A,p}$ and an output sharing $z^{A,p}$ can simply be computed. Indeed, the addition with y can be applied only to a single share in $x^{A,p}$ because $$z = \sum_{i=0}^{d-1} z_i^{A,p} = x_0^{A,p} + y + \sum_{i=1}^{d-1} x_i^{A,p} = y + \sum_{i=0}^{d-1} x_i^{A,p} = y+x.$$

Similar to arithmetic masking, Boolean masking enables to protect a k-bit variable x. The ensemble of the d shares of x is denoted as the Boolean sharing $x^{B,k}$, and the i-th share is denoted as $$x_i^{B,k}.$$

The sharing of the j-th bit of x is denoted as $x^{B,k}[j]$. The relation between x and its shares is given as:

$$x = \bigoplus_{i=0}^{d-1} x_i^{B,k},$$

where $\oplus$ denotes a bitwise exclusive OR.

In this disclosure, masked polynomials are used for which all the coefficients are either masked with Boolean masking or arithmetic masking. Polynomials are denoted with a hat, such as ĉ. As a result, a polynomial masked with arithmetic masking is denoted as $ĉ^{A,p}$, and similarly for Boolean masking it is $ĉ^{B,k}$. Polynomial multiplication is denoted with ∘. Unless mentioned otherwise, when an algorithm takes as input a polynomial, it is applied coefficient-wise.

In the embodiments described herein, both types of masking are leveraged. Hence, masking conversion algorithms are required. The first one enables for the conversion from arithmetic masking with p modulus to Boolean masking and is denoted as $$SecA2BMod p_p^d.$$

The second conversion algorithm enables the conversion from Boolean sharing to an arithmetic sharing. This algorithm is next denoted as $$SecB2AMod p_p^d.$$

When $p=2^k$, these algorithms are denoted such as $$SecA2B_k^d \text{ and } SecB2A_k^d$$

respectively. These power of two variants generally offer better performances than the variant for arbitrary p.

The embodiments described herein require performing additions between variables for which each bit is protected with Boolean masking. The embodiments described herein are independent of the specific implementation of these modules. The main building block is the secure full adder SecFullAdder. It takes as input three bits and returns two bits representing their addition. An addition on k bits, denoted as $$SecAdd_k^d,$$

may be built by chaining such SecFullAdder's. For a concrete instantiation of these algorithms see Olivier Bronchain and Gactan Cassiers, *Bitslicing arithmetic/boolean masking conversions for fun and profit with application to lattice-based kems*, IACR Trans. Cryptogr. Hardw. Embed. Syst. 2022 (2022), no. 4, 553-588, which is hereby incorporated for all purposes as if included herein. Similarly, an arithmetic subtraction can be performed by chaining together Sec-FullAdder's combined with a negation in two's complement. The details for this can be found in U.S. patent application Ser. No. 18/320,028 filed May 18, 2023, entitled "MASKED INFINITY NORM CHECK FOR CRYSTALS-DILITHIUM SIGNATURE GENERATION," which is hereby incorporated for all purposes as if included herein.

In 1882, Kronecker introduced a method to reduce computational problems related to multivariate polynomials to univariate polynomials (see L. Kronecker, *Grundzüge einer arithmetischenTtheorie der algebraischen Grösen*, Journal für die reine und angewandte Mathematik 92 (1882), 1-122). A hundred years later, a similar technique was introduced by Schönhage to reduce polynomial multiplications in $\mathbb{Z}$ [X] to integer multiplication (multiplications in $\mathbb{Z}$) (see Arnold Schönhage, *Asymptotically fast algorithms for the numerical multiplication and division of polynomials with complex coefficients*, Computer Algebra (Jacques Calmet, ed.), Springer Berlin Heidelberg, 1982, pp. 3-15). This approach is known as the Kronecker substitution method.

Given two polynomials $f,g \in \mathbb{Z}$ [X] of degree (up to) $N-1 \in \mathbb{Z}$, our goal is to compute the polynomial multiplication $h=f \cdot g$. The idea is to evaluate the polynomials at a sufficient high power of two (e.g., $f(2^{l'})$ and $g(2^{l'})$) and use the resulting integers as input for a regular integer multiplication by computing $h(2^{l'})=f(2^{l'}) \cdot g(2^{l'})$. The polynomial evaluation at $2^{l'}$ is denoted by $Kron(f,2^{l'})$, as shown in Algorithm 1. Finally, the resulting integer $h(2^{l'})$ is converted back to its polynomial representation h. The result is correct if the coefficients of the resulting polynomial did not "mix" with each other, i.e., if the parameter $l' \in \mathbb{Z}$ is sufficiently large. More precisely, if the coefficients of f and g are positive then l' should be chosen so that $2^{l'}$ is larger than the largest coefficient of $f \cdot g$. If the coefficients of f and g are signed, then $2^{l'}$ should be larger than $2 \cdot \|f \cdot g\|_\infty + 1$.

---

Algorithm 1 - Kron(ŝ, L)

Input: Polynomial $ŝ = \sum_{i=0}^{n-1} s_i \cdot x^i$ and public integer L, n.

Output: The integer polynomial evaluation $S = s(L)$.

1: return $\sum_{i=0}^{n-1} s_i \cdot L^i$    ▷ Share-wise polynomial evaluation

---

The main advantage of this approach, computing a polynomial multiplication with an integer multiplication, is that well-studied and fast implementations of asymptotic integer multiplication methods can be used. Fast integer arithmetic is typically available in existing hardware designed for ECC and/or RSA.

Polynomial evaluation is a linear operation, so with an arithmetic sharing modulo $2^{k'}$ with d shares on an input polynomial a masked version of $\mathrm{Kron}(f,2^{l'})$ can be applied straightforwardly. This routine called $$\mathrm{SecKron}_{k'}^{d}\left(x,\ 2^{l'}\right)$$

is summarized in Algorithm 2.

---

Algorithm 2 – $SecKron_{k'}^{d}\left(\hat{s}^{A,2^{k'}}, L\right)$

Input: Arithmetically shared secret key polynomial $\hat{s}^{A,2^{k'}} = \left(\hat{s}_{0}^{A,2^{k'}}, \dots, \hat{s}_{d-1}^{A,2^{k'}}\right)$ according to the Dilithium specification, and public integers $K = 2^{k}$, L, d.

Output: The evaluation of all shares of $\hat{s}^{A,2^{k'}}$ at Kronecker evaluation point $L$.

1: return $\left(Kron\left(\hat{s}_{0}^{A,2^{k'}}, L\right), \dots, Kron\left(\hat{s}_{d-1}^{A,2^{k'}}, L\right)\right)$   ▷ Share-wise polynomial evaluation

---

The Kronecker substitution method may be generalized to a more efficient algorithm called KroneckerPlus (or Kronecker+). In U.S. patent application Ser. No. 16/884,136 filed May 27, 2020, entitled "METHOD FOR MULTIPLYING POLYNOMIALS FOR A CRYPTOGRAPHIC OPERATION," which is hereby incorporated for all purposes as if included herein, the observation is made that $\zeta = X^{2n/t}$ is a principal t-th root of unity in the ring $\mathbb{Z}[X]/(X^{n}+1)$. Hence, the $\ell$n-bit multiplication may be reduced through Kronecker to t multiplications of $\ell$n/t bits each. Using the notation from above, the cost goes from $M(\ell \cdot n) + O(\ell \cdot n)$ to $t \cdot M(\ell \cdot n/t) + O(\ell \cdot n)$. This is done by evaluating f and g at $\zeta^{i} \cdot 2^{\ell/t}$ for i=0, 1, . . . t−1 as opposed to only $2^{\ell}$ and multiplying the respective factors modulo $X^{n/t}+1$. More concretely, the integers $$h\left(\zeta^{i}2^{\ell/t}\right) = f\left(\zeta^{i}2^{\ell/t}\right) \cdot g\left(\zeta^{i}2^{\ell/t}\right) \bmod\left(2^{\ell n/t} + 1\right), 0 \le i \le t - 1,$$

are computed, and it is noted that $$h^{(i)}\left(2^{\ell}\right) \equiv \frac{\sum_{j=0}^{t-1} \zeta^{i(t-j)} h\left(\zeta^{j} \cdot 2^{\ell t}\right)}{2^{i\ell t} \cdot t} \bmod\left(2^{\ell t n} + 1\right),$$

where $$h^{(i)}\left(2^{\ell}\right) = \sum_{j=0}^{n/t-1} h_{2tj+i} 2^{j\ell}.$$

To recover h, the appropriate $\ell$-bit limbs can be read off from the $h^{(i)}$.

In what follows, regular Kronecker substitution is used in the descriptions. However, at any point the Kronecker substitution may be replaced by KroneckerPlus to possibly obtain more efficient instantiations.

The embodiments described herein disclose methods for computing $\hat{y} + \hat{c}\hat{s}_{1}$ or $\hat{w}_{0} - \hat{c}\hat{s}_{2}$ in a secure fashion, where:

$\hat{y}$ is a polynomial with coefficients in $[-\gamma_{1}-1, \gamma_{1}]$ (of exactly $2\gamma_{1}$ bits);

$\hat{w}_{0}$ is a polynomial with coefficients in $(-\gamma_{2}, \gamma_{2})$;

$\hat{c}$ is a polynomial with exactly $\tau$ non-zero coefficients, which are either 1 or −1; and $\hat{s}_{1}, \hat{s}_{2}$ are polynomials with coefficients in $[-\eta, \eta]$.

Here $\gamma_{1}, \gamma_{2}, \tau$ and $\eta$ are constants defined by the parameter set of Dilithium, which are summarized in Table 1.

TABLE 1

| | NIST Security Level | | |
|---|---|---|---|
| | 2 | 3 | 5 |
| q | 8380417 | 8380417 | 8380417 |
| $\tau$ | 39 | 49 | 60 |
| $\gamma_{1}$ | 217 | 2 19 | 219 |
| $\gamma_{2}$ | 95232 | 261888 | 261888 |
| $\eta$ | 2 | 4 | 2 |
| $\beta$ | 78 | 196 | 120 |

Because c is a public challenge, no protection on it is required. All the other polynomials $\hat{y}$, $\hat{w}_{0}$, $\hat{s}_{1}$ and $\hat{s}_{2}$ are sensitive and require masking. The ephemeral secret value $\hat{y}$ is generated as the output of the extendable Output Function (XOF) SHAKE-256, hence is generated in Boolean masked form. Similarly, $\hat{w}_{0}$ is the output of a decomposition where it will typically be masked with Boolean shares. Hence, in this disclosure it will be assumed that the inputs are $\hat{y}^{B, log_{2}(2\gamma_{1})}$ and $\widehat{w_{0}}^{B, \lceil log_{2}(2\gamma_{2}) \rceil}$.

The long-term secrets $\hat{s}_{1}$ and $\hat{s}_{2}$ also require masking but might not be stored in masked form. This is because memory for storage of keys is often limited, while masking at least doubles the required memory (in case of 2 shares) and can be unnecessary if encryption is applied. Even worse, for arithmetic masking the size of the representation is more than doubled because the bit length of each share is greater than the bit length of the unmasked value (even up to 3 times). Moreover, because the representation defined by the Dilithium specification tightly packs the bits of the long-term secrets, several operations are required before an arithmetic mask can be generated. For example, secret keys for Dilithium2 include polynomial coefficients in [−2,2] that are serialized into 3 bit wide sequences, altogether using 3·256=768 bits per polynomial. To apply arithmetic masking modulo $2^{8}$ each of the 3 bits has to be extracted using a combination of Boolean operations (e.g., shifts, bitwise ANDs/ORs) and padding needs to be added. This is a significant amount of computation on unmasked data and could therefore leak information about the secrets. To avoid this, a Boolean mask is first generated for $\hat{s}_1$ and $\hat{s}_2$ after loading them from long-term storage and then converted (or parts thereof) to arithmetic masks modulo $K=2^{k'}$. Because only the polynomials that are needed for the computation one at a time, a lot of memory may be saved by having most polynomials stored with the smaller Boolean shares. Here K should be chosen such that no reductions occur during the computation of $\hat{e}\cdot\hat{s}_1$, because the (unreduced) integer values of the product are needed. This means that $K \geq 2\cdot\beta+1$, where $\beta$ is as described in Table 1. More concretely, $k' \geq 8$ for Dilithium2 and Dilithium5, and $k' \geq 9$ for Dilithium3. It is noted that the more obvious choice to mask $\hat{s}_i$ would be modulo q, because all arithmetic is performed modulo q anyway. However, the 23-bit q is much larger than the 8- or 9-bit K (requiring almost 3× as much memory to store the secrets), while mask conversions modulo primes are also more expensive compared to the analogous operations modulo a power of 2. Therefore, the choice for $K=2^{k'}$ is computationally advantageous and much more memory efficient.

Because c is unmasked and the $\hat{s}_i$ are masked, the multiplication $$c \cdot \widehat{s}_i^{A,2^{k'}}$$

is performed share-wise. Particularly interesting is the structure of $\hat{e}$, which is a very sparse polynomial. This makes it less suitable for multiplications using NTTs, which are not able to be used on this structure. On the other hand, Kronecker substitution may be instantiated very efficiently because the coefficients of $\hat{c}\cdot\widehat{s}_1$ are small. This is especially true in the presence of hardware for integer multiplications. Each share of $$\widehat{s}_i^{A,2^{k'}}$$

is a polynomial with (positive) coefficients in $[0, K-1]$, and hence the coefficients of the product lie in $[-\tau\cdot(K-1), \tau\cdot(K-1)]$. Therefore, the Kronecker evaluation point is selected as $L=2^{l'} \geq 2\cdot\tau\cdot(K-1)+1$. More concretely, $l' \geq 15$ for Dilithium2 and Dilithium5 and $l' \geq 16$ for Dilithium3.

Alternatively, one may avoid working with the signed representation of $\hat{c}$ by also reducing it modulo K to have its non-zero coefficients be either 1 or $K-1$. In that case the coefficients of the product will be in $[-\tau\cdot(K-1)^2, \tau\cdot(K-1)^2]$, so $L \geq 2\cdot\tau\cdot(K-1)^2+1$ may be chosen. More concretely, $l' \geq 23$ for Dilithium2 and Dilithium5 and $l' \geq 25$ for Dilithium3.

After finalizing the share-wise multiplication using Kronecker substitution, the result $$\hat{R}^{A,2^{k'}} = c \cdot \widehat{s}_i^{A,2^{k'}}$$

is arithmetically masked modulo $K=2^{k'}$, while $\hat{y}$ and $\hat{w}_0$ are Boolean masked. To perform the final addition or subtraction, the most obvious choice would be to convert $\hat{y}$ and $\hat{w}_0$ to arithmetic shares to perform the arithmetic addition/subtraction most easily. However, this would still require a mask conversion on $$\hat{R}^{A,2^{k'}}$$

because the mask length of k' bits is not sufficient for $\hat{y}$ and $\hat{w}_0$. Moreover, the subsequent operation performed on $\hat{y}+\hat{c}\hat{s}_1$ and $\hat{w}_0-\hat{c}\hat{s}_2$ will be to check their infinity norms, which is most easily done in Boolean masked form. Therefore, $$\hat{R}^{A,2^{k'}}$$

may be converted to a Boolean sharing instead and the arithmetic addition/subtraction is performed using a Sec-Add. Because the bit-length of $$\hat{R}^{A,2^{k'}}$$

is shorter than $\hat{y}$ and $\hat{w}_0$, this requires padding. The final length is at most 1 bit larger than the size of $\hat{y}$ or $\hat{w}_0$, respectively.

The final algorithm for $\hat{y}+\hat{c}\hat{s}_1$ is denoted SecChallenge-MADD and summarized in Algorithm 3. The final algorithm for $\hat{w}_0-\hat{c}\hat{s}_2$ is denoted SecChallengeMSUB and summarized in Algorithm 4. The application of SecKron may be replaced by an analogous instantiation of KroneckerPlus for selected integer t. This increases the complexity of the algorithm but may lead to faster implementations.

---

Algorithm 3 - SecChallengMADD$_{k'}^{d}$ ($\hat{y}^{B,log_2(2\gamma_1)}$, c, $\widehat{s}_1$, L)

Input: Secret key polynomial $\widehat{s}_1$, (public) challenge polynomial $\hat{c}$, Boolean masked ephemeral secret polynomial $\hat{y}^{B,log_2(2\gamma_1)}$ according to the Dilithium specification, and public integers $K = 2^k$, L, d such that $K \geq 2 \cdot \beta + 1$ and $L \geq 2 \cdot \tau \cdot (K - 1) + 1$.
Output: Boolean masked $\hat{y} + c\widehat{s}_1$ in $log_2(4\gamma_1)$ bits.

1: $\widehat{s}_1^{B,\lceil log(2\eta+1)\rceil} = \text{Mask}_{\lceil log_2(2\eta+1)\rceil}^{d}(\widehat{s}_1)$     ▷ Apply Boolean mask 2: $\widehat{s}_1^{A,2^{k'}} = \text{SecB2A}_{k'}^{d}(\widehat{s}_1^{B,\lceil log_2(2\eta+1)\rceil})$     ▷ Convert $\widehat{s}_1$ to arithmetic mask 3: $S_1^{A,2^{k'}} = \text{SecKron}_{k'}^{d}(\widehat{s}_1^{A,2^{k'}}, L)$     ▷ Apply share-wise Kronecker substitution 4: $C = \text{Kron}(\hat{c}, L)$     ▷ Apply Kronecker substitution -continued 5: $R^{A,2^{k'}} = C \cdot S_1^{A,2^{k'}}$       ▷ Apply share-wise integer multiplication 6: $\hat{R}^{A,2^{k'}} = R^{A,2^{k'}}$       ▷ Convert to polynomial representation 7: $\hat{R}^{B,log2(2\gamma_1)} = SecA2B_{k'}^d (\hat{R}^{A,2^{k'}})$       ▷ Convert to Boolean mask (pad to same size as $\hat{y}$)

8: $\hat{R}^{B,log_2(4\gamma_1)} = SecAdd_{log2(4\gamma_1)}^d (\hat{y}^{B,log_2(2\gamma_1)}, \hat{R}^{B,log_2(2\gamma_1)})$       ▷ Add $\hat{y}$ share-wise to $\hat{c}\hat{s_1}$ 9: return $\hat{R}^{B,log_2(4\gamma_1)}$

---

Algorithm 4 - SecChallengMSUB$_{k'}^d$ $(\hat{W}_0^{B,log_2(2\gamma_2)}, c, \hat{s_2}, L)$
Input: Secret key polynomial $\hat{s_2}$, (public) challenge polynomial $\hat{c}$, Boolean masked
ephemeral secret polynomial $\hat{W}_0^{B,log_2(2\gamma_2)}$ according to the Dilithium specification, and
public integers $K = 2^k$, L, d such that $K \geq 2 \cdot \beta + 1$ and $L \geq 2 \cdot \tau \cdot (K - 1) + 1$.
Output: Boolean masked $\hat{W}_0 - \hat{c}\hat{s_2}$ in $log_2(4\gamma_2)$ bits.
1: $\hat{s_2}^{B,\lceil log_2(2\eta+1)\rceil} = Mask_{\lceil log2(2\eta+1)\rceil}^d (\hat{s_2})$       ▷ Apply Boolean mask 2: $\hat{s_2}^{A,2^{k'}} = SecB2A_{k'}^d \left(\hat{s_2}^{B,\lceil log2(2\eta+1)\rceil}\right)$       ▷ Convert $\hat{s_2}$ to arithmetic mask 3: $S_2^{A,2^{k'}} = SecKron_{k'}^d \left(\hat{s_2}^{A,2^{k'}}, L\right)$       ▷ Apply share-wise Kronecker substitution 4: $C = Kron(\hat{c}, L)$       ▷ Apply Kronecker substitution 5: $R^{A,2^{k'}} = C \cdot S_1^{A,2^{k'}}$       ▷Apply share-wise integer multiplication 6: $\hat{R}^{A,2^{k'}} = R^{A,2^{k'}}$       ▷ Convert to polynomial representation 7: $\hat{R}^{B,log2(2\gamma_2)} = SecA2B_{k'}^d (\hat{R}^{A,2^{k'}})$       ▷ Convert to Boolean mask (pad to same size as $\hat{W}_0$)

8: $\hat{R}^{B,log_2(4\gamma_2)} = SecAdd_{log2(4\gamma_2)}^d (\hat{W}_0^{B,log_2(2\gamma_2)}, \hat{R}^{B,log_2(2\gamma_2)})$       ▷ Subtract $\hat{c}\hat{s_2}$ share-wise from $\hat{W}_0$
9: return $\hat{R}^{B,log_2(4\gamma_2)}$

---

The advantages of the above described methods over other methods will now be described. The established method of masking Dilithium is to rely on masks modulo the prime q, because all arithmetic operations are performed in $\mathbb{Z}_q[X]/(X^{256}+1)$ using NTTs. In this way representing a single polynomial of $\hat{s_1}$ or $\hat{s_2}$ requires 736 bytes if exactly 23 bits per coefficient are used, and 1024 bytes if a more implementation-friendly 32 bits per coefficient are used. If all of $\hat{s_1}$ or $\hat{s_2}$ were loaded into volatile memory at once it could require up to 1024·k=8192 bytes only to store one of the long-term secrets without masking. Using first-order masking with d=2 we would need 2·8192=16384 bytes only to store one of $\hat{s_1}$ or $\hat{s_2}$. On the other hand, if $\hat{s_1}$ or $\hat{s_2}$ were Boolean masked they require only 3 bits per coefficient for Dilithium2 and Dilithium5, and 4 bits per coefficient for Dilithium3. With this method storing all of $\hat{s_1}$ or $\hat{s_2}$ requires at most 4·256·6/8=768 bytes across all parameter sets. This shows the huge benefit of an initial Boolean mask on the serialized long-term secrets, followed by a mask conversion on-the-fly whenever an element of the vector is needed.

Moreover, the packed representation of $\hat{s_1}$ and $\hat{s_2}$ represents an element in [−2,2] or [−4,4] (depending on the parameter set) in 3 or 4 bits, respectively. Converting this to a representation in 23 bits modulo q requires operations on the packed but unprotected bits of the long-term secret. This would result in significant leakage that is avoided by immediately applying a Boolean mask and unpacking afterwards.

Besides, it is noted that the 23 bits from q are more than necessary for masking. The only requirement is that there are no reduction in the operations $c \cdot \hat{s_1}$ and $c \cdot \hat{s_2}$, and therefore it suffices to select a masking value that is at least 2·β+1. Because masked operations work most efficiently with powers of two, the smallest power of two $2^{k'}$ that is larger than 2·β+1 is simply selected. More concretely, the SecA2B and SecB2A operations may simple be used instead of the slower SecA2BModp and SecB2AModp for the prime q.

One of the downsides of avoiding q is that NTTs are no longer available for the polynomial multiplication. However, with the availability of co-processors for integer multiplication, the Kronecker substitution method (or KroneckerPlus) leads to extremely fast multiplication routines. This could be replaced by other routines if integer multiplication hardware is not available, such as schoolbook multiplication.

Because an arithmetic mask modulo a power of 2 is used, the mask conversions to Boolean shares are fairly cheap. Therefore, instead of converting $\hat{y}$ and $\hat{w}_0$ to arithmetic masks, the product polynomials are converted to Boolean masks instead. This allows for performing the addition/subtraction in Boolean domain using a SecAdd or SecSub. Although not as efficient as when done in arithmetic domain, this may still be performed very efficiently by bitslicing the coefficients and performing all the additions in parallel. More generally, all operations except the arithmetic polynomial multiplication may be bitsliced and therefore be computed very efficiently. This has the added benefit that single-bit leakage is much harder to exploit.

Finally, the representations of the chosen masks fit most conveniently with the operations before (generating $\hat{y}$ with SHAKE-256 and decomposition for $\hat{w}_0$) and afterwards (infinity norm checks). All in all this algorithm leads to a more memory friendly and efficient approach compared to masking modulo q as is done existing literature.

FIG. 2 illustrates an exemplary hardware diagram 200 for implementing cryptographic operation such as $y+cs_1$ or $w_0-cs_2$. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 230 may include various memories such as, for example L1, L2, or L3 cache or system memory. As such, the memory 230 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 240 may include one or more devices for enabling communication with a user such as an administrator. For example, the user interface 240 may include a display, a touch interface, a mouse, and/or a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol or other communications protocols, including wireless protocols. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. The storage 262 may include instructions for carrying out cryptographic operations such as for example $y+cs_1$ or $w_0-cs_2$.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

The system bus 210 allows communication between the processor 220, memory 230, user interface 240, storage 260, and network interface 250.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having" and/or the like are intended to be open-ended terms. Further, the phrase "based on" is intended to mean "based, at least in part, on" unless explicitly stated otherwise.

What is claimed is:

1. A data processing system comprising instructions embodied in a non-transitory computer readable medium, the instructions for a cryptographic operation using polynomials for lattice-based cryptography, the instructions, when executed, are configured to cause a processor to perform a method comprising:

applying a share-wise Kronecker substitution to arithmetic shares of a first polynomial;

applying a Kronecker substitution to a second polynomial;

multiplying share-wise the Kronecker substitution of the second polynomial and the arithmetic shares of the Kronecker substitution of the shares of the first polynomial to produce arithmetic shares of a first output;

converting the shares of the first output to arithmetic shares of a polynomial representation;

converting the arithmetic shares of the polynomial representation to Boolean shares of the polynomial representation;

arithmetically adding the Boolean shares of the polynomial representation to Boolean shares of a third polynomial to produce Boolean shares of a second output; and carrying out a cryptographic operation using the Boolean shares of the second output to digitally sign data, decrypt data, or authenticate data.

2. The data processing system of claim 1, wherein the instructions further comprise instructions that cause the processor to perform the method further comprising:

converting Boolean shares of the first polynomial into the arithmetic shares of the first polynomial.

3. The data processing system of claim 2, wherein converting Boolean shares of the first polynomial into the arithmetic shares of the first polynomial includes calculating:

$$\hat{s}_1^{A,2^{k'}} = \mathrm{SecB2A}_{k'}^{d}\left(\hat{s}_1^{B,\lceil log_2(2\eta+1)\rceil}\right),$$

where $$\hat{s}_1^{A,2^{k'}}$$

are arithmetic shares of the first polynomial, d is a number of shares, $$\mathrm{SecB2A}_{k'}^{b},$$

is a secure Boolean to arithmetic shares conversion function, $\hat{s}_1^{B,\lceil log_2(2\eta+1)\rceil}$ are Boolean shares of the first polynomial, $\eta$ defines a range $[-\eta,\eta]$ of coefficients of the first polynomial $\hat{s}_1$, and k' is the arithmetic modulus.

4. The data processing system of claim 1, wherein the Kronecker substitution is a Kronecker plus substitution.

5. The data processing system of claim 1, wherein multiplying share-wise the Kronecker substitution of the second polynomial and the arithmetic shares of the Kronecker substitution of the shares of the first polynomial includes calculating $$R^{A,2^{k'}} = C \cdot S_1^{A,2^{k'}},$$

where $$R^{A,2^{k'}}$$

are the arithmetic shares of a first output, C is a Kronecker representation of the second polynomial, and $$S_1^{A,2^{k'}}.$$

are the arithmetic shares of a Kronecker representation of the first polynomial.

6. The data processing system of claim 1, wherein adding the Boolean shares of the polynomial representation to Boolean shares of a third polynomial to produce Boolean shares of a second output includes calculating $$\hat{R}^{B,log2(4\gamma_1)} = \text{SecAdd}^d_{log2(4\gamma_1)}\left(\hat{y}^{B,log2(2\gamma_1)}, \hat{R}^{B,log2(2\gamma_1)}\right),$$

where $\hat{R}^{B,log2(4\gamma_1)}$ are Boolean shares of the second output, $$\text{SecAdd}^d_{log2(4\gamma_1)}$$

is a secure add function, $\hat{y}^{B,log2(2\gamma_1)}$ are the Boolean shares of a third polynomial, $\hat{R}^{B,log2(2\gamma_1)}$ are the Boolean shares of the polynomial representation, and Y1 defines a range $[-\gamma_1-1, \gamma_1]$ of the coefficients of the third polynomial $\hat{y}$.

7. A data processing system comprising instructions embodied in a non-transitory computer readable medium, the instructions for a cryptographic operation using polynomials for lattice-based cryptography, the instructions, when executed, cause a processor to perform a method comprising:

applying a share-wise Kronecker substitution to arithmetic shares of a first polynomial;

applying a Kronecker substitution to a second polynomial;

multiplying share-wise the Kronecker substitution of the second polynomial and the arithmetic shares of the Kronecker substitution of the shares of the first polynomial to produce arithmetic shares of a first output;

converting the shares of the first output to arithmetic shares of a polynomial representation;

converting the arithmetic shares of the polynomial representation to Boolean shares of the polynomial representation;

subtracting the Boolean shares of the polynomial representation to Boolean shares of a third polynomial to produce Boolean shares of a second output; and carrying out a cryptographic operation using the Boolean shares of the second output to digitally sign data, decrypt data, encrypt data, or authenticate data.

8. The data processing system of claim 7, wherein the instructions, when executed, cause the processor to perform the method further comprising:

converting Boolean shares of the first polynomial into the arithmetic shares of the first polynomial.

9. The data processing system of claim 8, wherein converting Boolean shares of the first polynomial into the arithmetic shares of the first polynomial includes calculating:

$$\hat{s}_2^{A,2^{k'}} = \text{SecB2A}^d_{k'}\left(\hat{s}_2^{B,\lceil log2(2\eta+1)\rceil}\right),$$

where $$\hat{s}_2^{A,2^{k'}}$$

are arithmetic shares of the first polynomial, d is a number of shares, $$\text{SecB2A}^b_{k'}$$

is a secure Boolean to arithmetic shares conversion function, $\hat{s}_2^{B,\lceil log2(2\eta+1)\rceil}$ are Boolean shares of the first polynomial, $\eta$ defines a range $[-\eta,\eta]$ of coefficients of the first polynomial $\hat{s}_2$, and k' is the arithmetic modulus.

10. The data processing system of claim 7, wherein the Kronecker substitution is a Kronecker plus substitution.

11. The data processing system of claim 7, wherein multiplying share-wise the Kronecker substitution of the second polynomial and the arithmetic shares of the Kronecker substitution of the shares of the first polynomial includes calculating $$R^{A,2^{k'}} = C \cdot S_2^{A,2^{k'}},$$

where $$R^{A,2^{k'}}$$

are the arithmetic shares of a first output, C is a Kronecker representation of the second polynomial, and $$S_2^{A,2^{k'}}$$

are the arithmetic shares of a Kronecker representation of the first polynomial.

12. The data processing system of claim 7, wherein subtracting the Boolean shares of the polynomial representation to Boolean shares of a third polynomial to produce Boolean shares of a second output includes calculating $$\hat{R}^{B,log2(4\gamma_2)} \leftarrow \text{SecSub}^d_{log2(4\gamma_2)}\left(\hat{w}_0^{B,log2(2\gamma_2)}, \hat{R}^{B,log2(2\gamma_2)}\right),$$

where $\hat{R}^{B,log2(4\gamma_2)}$ are the Boolean shares of the second output, $$\text{SecAdd}^d_{log2(4\gamma_1)})$$

is a secure add function, $\hat{w}_0^{B,log2(2\gamma_2)}$ are the Boolean shares of a third polynomial, $\hat{R}^{B,log2(2\gamma_2)}$ are the Boolean shares of the polynomial representation, and $\gamma_2$ defines a range $(-\gamma_2, \gamma_2)$ of the coefficients of the third polynomial $\hat{w}_0$.

13. A method for a cryptographic operation using polynomials for lattice- based cryptography, the method comprising:

applying, by a processor of a computing device, a share-wise Kronecker substitution to arithmetic shares of a first polynomial;

applying, by the processor, a Kronecker substitution to a second polynomial;

multiplying, by the processor, share-wise the Kronecker substitution of the second polynomial and the arithmetic shares of the Kronecker substitution of the shares of the first polynomial to produce arithmetic shares of a first output;

converting, by the processor, the shares of the first output to arithmetic shares of a polynomial representation;

converting, by the processor, the arithmetic shares of the polynomial representation to Boolean shares of the polynomial representation;

arithmetically adding, by the processor, the Boolean shares of the polynomial representation to Boolean shares of a third polynomial to produce Boolean shares of a second output; and carrying out, by the processor, a cryptographic operation using the Boolean shares of the second output to digitally sign data, decrypt data, encrypt data, or authenticate data.

14. The method of claim 13, further comprising converting, by the processor, Boolean shares of the first polynomial into the arithmetic shares of the first polynomial.

15. The method of claim 14, wherein converting Boolean shares of the first polynomial into the arithmetic shares of the first polynomial includes calculating:

$$\hat{s}_1^{A,2^{k'}} = SecB2A_{k'}^d(\hat{s}_1^{B,\lceil log_2(2\eta+1)\rceil}),$$

where $$\hat{s}_1^{A,2^{k'}}$$

are arithmetic shares of the first polynomial, d is a number of shares, $$SecB2A_{k'}^b$$

is a secure Boolean to arithmetic shares conversion function, $\hat{s}_1^{B,\lceil log_2(2\eta+1)\rceil}$ are Boolean shares of the first polynomial, $\eta$ defines a range $[-\eta,\eta]$ of coefficients of the first polynomial $\hat{s}_1$, and k' is the arithmetic modulus.

16. The method of claim 13, wherein the Kronecker substitution is a Kronecker plus substitution.

17. The method of claim 13, wherein multiplying share-wise the Kronecker substitution of the second polynomial and the arithmetic shares of the Kronecker substitution of the shares of the first polynomial includes calculating $$R^{A,2^{k'}} = C \cdot S_1^{A,2^{k'}},$$

where $$R^{A,2^{k'}}$$

are the arithmetic shares of a first output, C is a Kronecker representation of the second polynomial, and $$S_1^{A,2^{k'}}$$

are the arithmetic shares of a Kronecker representation of the first polynomial.

18. The method of claim 13, wherein adding the Boolean shares of the polynomial representation to Boolean shares of a third polynomial to produce Boolean shares of a second output includes calculating $$\hat{R}^{B,log_2(4\gamma_1)} = SecAdd_{log_2(4\gamma_1)}^d(\hat{y}^{B,log_2(2\gamma_1)}, \hat{R}^{B,log_2(2\gamma_1)}),$$

where $\hat{R}^{B,log_2(4\gamma_1)}$ are Boolean shares of the second output, $$SecAdd_{log_2(4\gamma_1)}^d$$

is a secure add function, $\hat{y}^{B,log_2(2\gamma_1)}$ are the Boolean shares of a third polynomial, $\hat{R}^{B,log_2(2\gamma_1)}$ are the Boolean shares of the polynomial representation, and $\gamma_1$ defines a range $[-\gamma_1-1,\gamma_1]$ of the coefficients of the third polynomial $\hat{y}$.

19. A method for a cryptographic operation using polynomials for lattice- based cryptography, the instructions, when executed, cause a processor to perform the method comprising:

applying a share-wise Kronecker substitution to arithmetic shares of a first polynomial;

applying a Kronecker substitution to a second polynomial;

multiplying share-wise the Kronecker substitution of the second polynomial and the arithmetic shares of the Kronecker substitution of the shares of the first polynomial to produce arithmetic shares of a first output;

converting the shares of the first output to arithmetic shares of a polynomial representation;

converting the arithmetic shares of the polynomial representation to Boolean shares of the polynomial representation;

subtracting the Boolean shares of the polynomial representation to Boolean shares of a third polynomial to produce Boolean shares of a second output; and carrying out a cryptographic operation using the Boolean shares of the second output to digitally sign data, decrypt data, encrypt data, or authenticate data.

20. The method of claim 19, wherein the instructions, when executed, cause the processor to perform the method further comprising:

converting Boolean shares of the first polynomial into the arithmetic shares of the first polynomial.

21. The method of claim 20, wherein converting Boolean shares of the first polynomial into the arithmetic shares of the first polynomial includes calculating:

$$\hat{s}_2^{A,2^{k'}} = SecB2A_{k'}^d(\hat{s}_2^{B,\lceil log_2(2\eta+1)\rceil}),$$

where $$\hat{s}_2^{A,2^{k'}}$$

are arithmetic shares of the first polynomial, d is a number of shares, $$SecB2A_{k'}^b$$

is a secure Boolean to arithmetic shares conversion function, $\hat{s}_1^{B,\lceil log_2(2\eta+1)\rceil}$ are Boolean shares of the first polynomial, $\eta$ defines a range $[-\eta,\eta]$ of coefficients of the first polynomial $\hat{s}_2$, and k' is the arithmetic modulus.

22. The method of claim 19, wherein the Kronecker substitution is a Kronecker plus substitution.

23. The method of claim 19, wherein multiplying share-wise the Kronecker substitution of the second polynomial and the arithmetic shares of the Kronecker substitution of the shares of the first polynomial includes calculating $$R^{A,2^{k'}} = C \cdot S_2^{A,2^{k'}},$$

where $$R^{A,2^{k'}}$$

are the arithmetic shares of a first output, C is a Kronecker representation of the second polynomial, and $$S_2^{A,2^{k'}}$$

are the arithmetic shares of a Kronecker representation of the first polynomial.

24. The method of claim 19, wherein subtracting the Boolean shares of the polynomial representation to Boolean shares of a third polynomial to produce Boolean shares of a second output includes calculating $$\hat{R}^{B,log_2(4\gamma_2)} \leftarrow \text{SecSub}_{log_2(4\gamma_2)}^d \left( \widehat{w_0}^{B,log_2(2\gamma_2)}, \hat{R}^{B,log_2(2\gamma_2)} \right),$$

where $\hat{R}^{B,log_2(4\gamma_2)}$ are the Boolean shares of the second output, $$\text{SecAdd}_{log_2(4\gamma_1)}^d)$$

is a secure add function, $\widehat{w_0}^{B,log_2(2\gamma_2)}$ are the Boolean shares of a third polynomial, $\hat{R}^{B,log_2(2\gamma_2)}$ are the Boolean shares of the polynomial representation, and $\gamma_2$ defines a range ($-\gamma_2$, $\gamma_2$) of the coefficients of the third polynomial $\widehat{w_0}$.

* * * * *